(12) United States Patent
Creviston

(10) Patent No.: US 8,456,044 B2
(45) Date of Patent: Jun. 4, 2013

(54) MATERIAL MATRIX FOR COOLING MEDIA ENHANCEMENT

(75) Inventor: Alex Creviston, Muncie, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 219 days.

(21) Appl. No.: 12/858,800

(22) Filed: Aug. 18, 2010

(65) Prior Publication Data

US 2012/0043835 A1    Feb. 23, 2012

(51) Int. Cl.
*H02K 9/00*     (2006.01)

(52) U.S. Cl.
USPC .............................. 310/52; 310/54

(58) Field of Classification Search
USPC .......................... 310/52, 54, 58, 64
See application file for complete search history.

(56) References Cited

U.S. PATENT DOCUMENTS

| | | | |
|---|---|---|---|
| 5,491,370 A * | 2/1996 | Schneider et al. | 310/54 |
| 5,621,264 A * | 4/1997 | Epstein et al. | 310/339 |
| 6,617,716 B2 * | 9/2003 | Ishida | 310/58 |
| 6,954,010 B2 * | 10/2005 | Rippel et al. | 310/60 A |
| 2007/0085426 A1 | 4/2007 | Lee et al. | |

FOREIGN PATENT DOCUMENTS

| | | |
|---|---|---|
| JP | 09046973 | 2/1997 |
| JP | 2007282341 | 10/2007 |
| KR | 1020090048028 | 5/2009 |

OTHER PUBLICATIONS

Notification of Transmittal of the International Search Report and the Written Opinion of the International Searching Authority, or the Declaration; PCT/US2011/048213; Mar. 13, 2012.

* cited by examiner

*Primary Examiner* — Nguyen N Hanh
(74) *Attorney, Agent, or Firm* — Cantor Colburn LLP

(57) ABSTRACT

An electric machine includes: a stator having stator windings; a rotor configured to interact electromagnetically with the stator; and a housing configured to house the stator and the rotor. A material matrix is disposed within the housing and in contact with the stator windings. The material matrix defines a plurality of passages configured for the cooling fluid to flow within to remove heat from the stator windings.

19 Claims, 2 Drawing Sheets

MATERIAL MATRIX FOR COOLING MEDIA ENHANCEMENT

BACKGROUND

Exemplary embodiments pertain to the art of electric machines and, more particularly, to an electric machine having improved cooling.

Machines such as electric motors and generators typically generate heat during operation. The heat can result from friction and/or resistance to electrical current in windings. Unfortunately, heat can be detrimental to the operation of the machines. The effects of heat can be realized in both the short term, such as where immediate damage is incurred or in the longer term such as where decreased reliability or lifespan become an issue. In the art the effects of heat have traditionally been addressed through the use of additional equipment to remove excess heat but while these may function adequately, they can add significantly to the cost of manufacture of the machines. With efficiency being ever more important in a tight economy, alternate cooling schemes having positive effect on overall performance and cost reduction would be well received by the art.

BRIEF DESCRIPTION

Disclosed is an electric machine including: a stator having stator windings; a rotor configured to interact electromagnetically with the stator; and a housing configured to house the stator and the rotor. A material matrix is disposed within the housing and in contact with the stator windings. The material matrix defines a plurality of passages configured for the cooling fluid to flow within to remove heat from the stator windings.

Also disclosed is a method of operating an electric machine, the method includes: energizing an electric machine including a stator having stator windings, a rotor configured to interact electromagnetically with the stator, and a housing configured to house the stator and the rotor; and flowing a cooling fluid through a material matrix disposed within the housing and in contact with the stator windings, the material matrix defining a plurality of passages configured for the cooling fluid to flow within to remove heat from the stator windings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
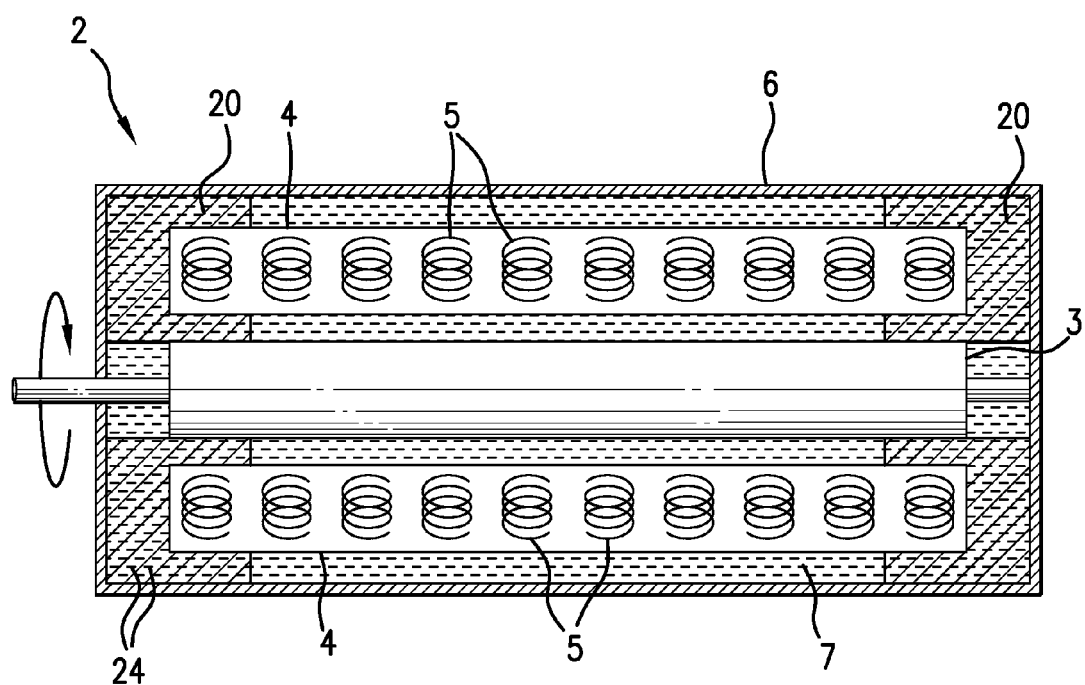
FIG. 1 is cross sectional illustration of an exemplary embodiment of an electric machine having a stator, a rotor, and a cooling fluid.

Reference may now be had to FIG. 1 illustrating a cross-sectional view. An electric machine in accordance with an exemplary embodiment is indicated generally at 2. The electric machine 2 includes a rotor 3 and a stator 4 having a plurality of stator windings 5. The rotor 3 is configured to interact electromagnetically with the stator 4 during operation of the electric machine 2. Exemplary embodiments of the electric machine 2 include an electric motor and a generator. The rotor 3 and the stator 4 are disposed within a housing 6. The electric machine 2 includes a cooling fluid 7 contained within the housing 6. In one embodiment, rotation of the rotor 3 urges circulation of the cooling fluid 7 within the housing 6. The cooling fluid 7 is configured to cool internal components of the electric machine 2 such as the stator windings 5 for example. In one embodiment, the cooling fluid 7 is oil.

Figure 2:
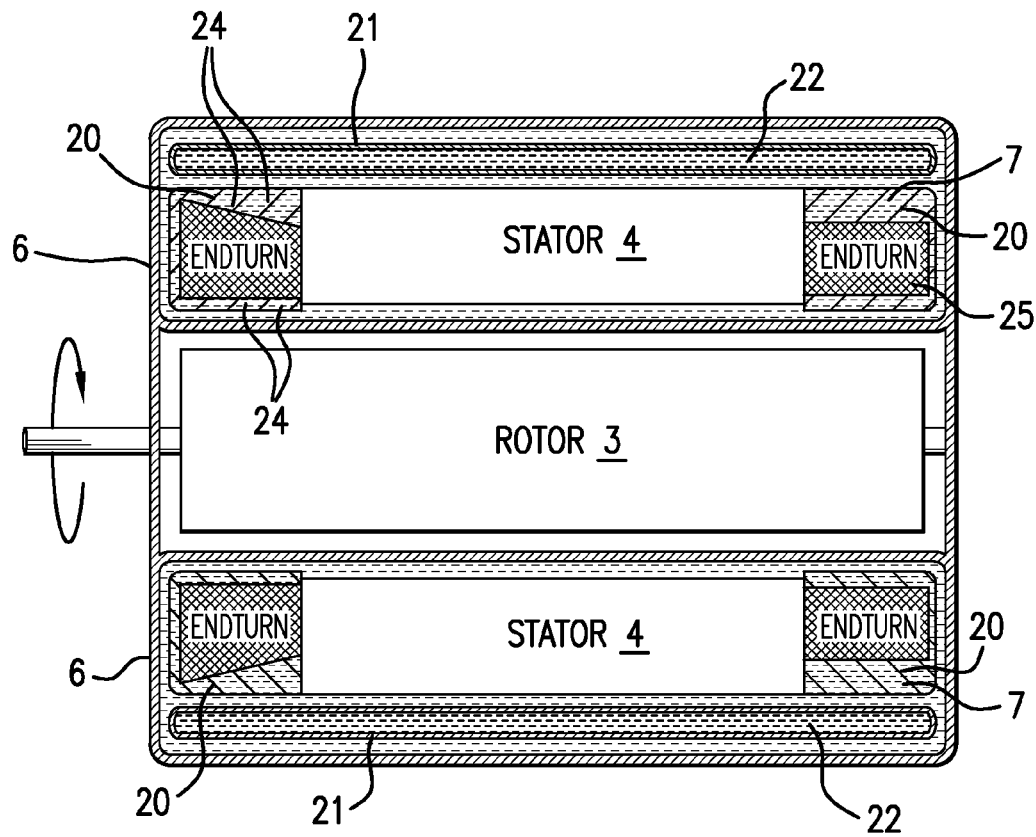
FIG. 2 is an illustration of a material matrix disposed at end windings of the stator.

Reference may now be had to FIG. 2 depicting aspects of the stator 4. Stator windings 5 at the two ends of the stator 4 are referred to end stator windings 25. Disposed at each of the end stator windings 25 is a material matrix 20. The material matrix 20 is a material defining a plurality of passages 24 through which the cooling fluid 7 can flow. In general, the material making up the material matrix 20 and surrounding the plurality of passages is a solid material. Spaces between the end stator windings 20 and a volume about each of the end stator windings 25 are filled with the material matrix 20, which is in contact with the end stator windings 25.

Also shown in FIG. 2 is a cooling jacket 21 configured to contain a cooling jacket fluid 22. During operation of the electric machine 2, the cooling jacket 21 is heated by the cooling fluid 7 contained within the housing 6. The heat absorbed by the cooling jacket 21 in turn heats the cooling jacket fluid 22. The cooling jacket fluid 22 circulates through the cooling jacket 21 and transfers the heat to an ultimate heat sink (not shown). If the ultimate heat sink is ambient air, then a radiator may be used to transfer the heat from the cooling jacket fluid 22 to the ambient air. If the ultimate heat sink is a liquid, then a heat exchanger may be used to transfer the heat from the cooling jacket fluid 22 to the liquid. In the embodiment of FIG. 2, the cooling jacket 21 is built into the housing 6.

For context, aspects of heat transfer are now discussed. The effectiveness of liquid cooled systems is based on the thermal transfer efficiency between the heat generating area (such as the stator windings 5) and the heat removal media (such as the cooling fluid 7). Without effective transfer mechanisms, increased flow rates of cooling media will have little to no effect on the total heat rejection capability of the system. A major component of thermal transfer is the amount of time that a cooling media interacts with the heat generating object, the longer the dwell time, the lower the corresponding final temperature difference (i.e., delta T) and the larger the energy transfer to the cooling media.

Another aspect of thermal transfer efficiency is the way that the liquid cooling media interacts with the heat-generating object. As the turbulence of the liquid cooling media increases, the thermal transfer between the liquid cooling media and the heat-generating object also increases.

The function of the material matrix 20 is to increase the thermal transfer by increasing fluid turbulence and dwell time. By slowing down the flow of the cooling fluid 7, increasing the turbulence of the cooling fluid 7, and giving the cooling fluid 7 a more directed flow path towards the end stator windings 25, the thermal transfer efficiency between the end stator windings 25 and the cooling fluid 7 will increase. Accordingly, the thermal transfer efficiency to the ultimate heat sink will also increase due to the greater transfer efficiency realized at the heat generating component.

The material matrix 20 as a mat or fabric matrix acts as a sponge and/or a flow limiter for the cooling fluid 7 at the end stator windings 25. The material matrix 20 will also provide a large surface area for the cooling fluid 7 to interact with and, thus, transfer heat to the cooling fluid 7. In addition, the material matrix 20 will provide: a directed flow path to or near the end stator windings 25, a restriction to flow of the cooling fluid 7, a turbulence inducing disturbance of the cooling fluid 7, and a total volume reduction to reduce the amount of cooling fluid 7 required between the end stator windings 25 and an interior surface of the housing 6 or the cooling jacket 21.

The volumetric density of the material matrix 20 may vary depending on: the flow capabilities of the cooling fluid 7 in the electric motor 2, the design of the electric motor 2, and the tuning of the heat conduction capability from the end stator windings 5 to the interior surface of the housing 6 or the cooling jacket 21.

Non-limiting embodiments of the material matrix 20 include: a glass mat, a non-abrasive polymer, anodized or oxidized aluminum, coated steel, brass or copper wool, and a natural material such as cotton or jute or combinations including at least one of the foregoing. Coatings are generally used to prevent oxidation and/or electrical conduction of the material matrix 20.

Figure 3:
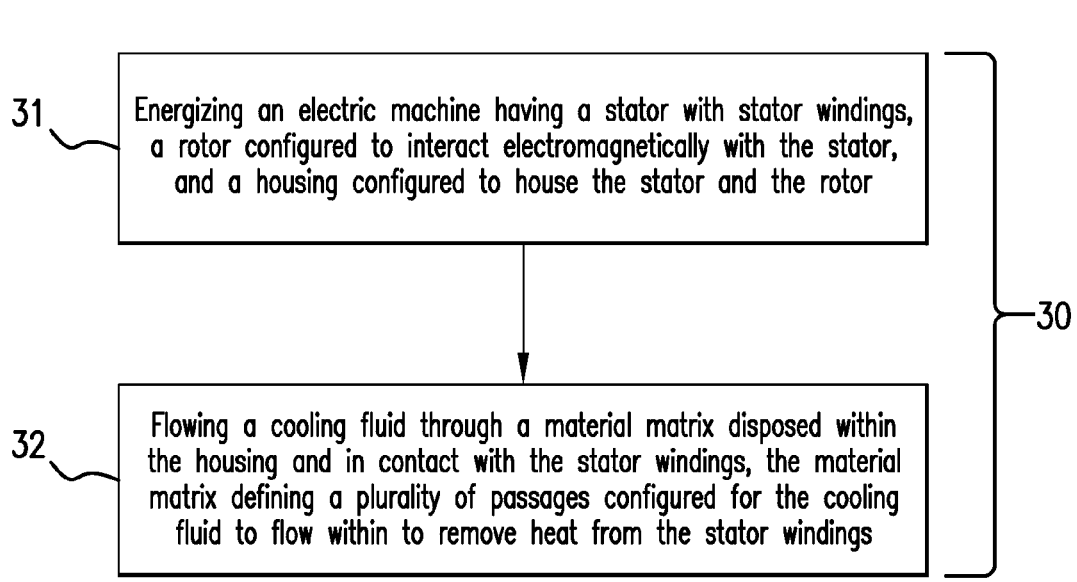
FIG. 3 presents one example of a method for operating the electric machine.

FIG. 3 presents one example of a method 30 for operating the electric machine 2. The method 30 calls for (step 31) energizing the electric machine 2. Energizing can include inputting electric power to the stator 4 when the electric machine 2 is used as a motor or rotating the rotor and receiving electric power from the stator 4 when the electric machine 2 is used as a generator. In general, when the electric machine 2 is energized, the cooling fluid 7 is circulated within the housing 6. Further, the method 30 calls for (step 32) flowing the cooling fluid through the material matrix 20, which is disposed within the housing 6 and in contact with the stator windings 5, to remove heat from the stator windings 5.

At this point it should be understood that the exemplary embodiments provide an electric motor with increased cooling capability and/or efficiency, which can result in longer life and increased reliability. The increased cooling efficiency can result in smaller cooling components and an associated decrease in cost.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
    a stator comprising stator windings;
    a rotor configured to interact electromagnetically with the stator;
    a housing configured to house the stator and the rotor; and
    a material matrix disposed within the housing and in contact with the stator windings, the material matrix comprising a plurality of fibers that define a plurality of passages configured to convey a cooling fluid to remove heat from the stator windings.

2. The electric machine according to claim 1, further comprising a cooling jacket disposed at the housing and configured to contain a cooling jacket fluid, the cooling jacket fluid being configured to remove heat from the cooling fluid.

3. The electric machine according to claim 2, wherein the cooling jacket is part of the housing.

4. The electric machine according to claim 1, wherein the cooling fluid is oil.

5. The electric machine according to claim 1, wherein the material matrix is disposed at end stator windings.

6. The electric machine according to claim 1, wherein the matrix material is structured as a mat, wool or combinations including at least one of the foregoing.

7. The electric machine according to claim 1, wherein the material matrix comprises glass, a non-abrasive polymer, anodized or oxidized aluminum, coated steel, brass, copper, or a natural material, or combinations including at least one of the foregoing.

8. The electric machine according to claim 7, wherein the natural material comprises cotton, jute or combinations including at least one of the foregoing.

9. The electric machine according to claim 1, wherein plurality of passages in the material matrix are configured to direct the cooling fluid towards the stator windings.

10. The electric machine according to claim 1, wherein the material matrix is configured to induce turbulence in the cooling fluid.

11. The electric machine according to claim 1, wherein the material matrix is configured to reduce a volume of the cooling fluid between the stator windings and an interior surface of the housing.

12. The electric machine according to claim 1, wherein the electric machine is an electric motor.

13. The electric machine according to claim 1, wherein the electric machine is an electric generator.

14. A method of operating an electric machine, the method comprising:
    energizing an electric machine comprising a stator having stator windings, a rotor configured to interact electromagnetically with the stator, and a housing configured to house the stator and the rotor; and
    flowing a cooling fluid through a material matrix disposed within the housing and in contact with the stator windings, the material matrix comprising a plurality of fibers that define a plurality of passages configured for the cooling fluid to flow within to remove heat from the stator windings.

15. The method according to claim 14, further comprising removing the heat from the cooling fluid with a cooling jacket fluid disposed in a cooling jacket that is disposed at the housing.

16. The method according to claim 14, further comprising inducing turbulence in the cooling fluid passing through the plurality of passages in the matrix material.

17. The method according to claim 14, further comprising directing the cooling fluid passing through the plurality of passages in the matrix material towards the stator windings.

18. The method according to claim 14, further comprising transferring heat from the stator windings to the matrix material.

19. The method according to claim 18, further comprising transferring heat from the matrix material to the cooling fluid.

\* \* \* \* \*